Oct. 27, 1959 — C. B. VALLIANT ET AL — 2,910,136
APPARATUS FOR SEPARATING FLUIDS
Filed July 20, 1956 — 2 Sheets-Sheet 1

CHARLES B. VALLIANT &
WILLIAM L. SCHEIRMAN
*INVENTORS*

BY *[signature]*

ATTORNEY

CHARLES B. VALLIANT &
WILLIAM L. SCHEIRMAN
*INVENTORS*

United States Patent Office 2,910,136
Patented Oct. 27, 1959

2,910,136
APPARATUS FOR SEPARATING FLUIDS

Charles B. Valliant, San Antonio, Tex., and William L. Scheirman, Oklahoma City, Okla., assignors to Black, Sivalls & Bryson, Inc., Kansas City, Mo., a corporation of Delaware Application July 20, 1956, Serial No. 599,212

8 Claims. (Cl. 183—2.7)

The present invention relates generally to a method and apparatus for separating a liquid from a gas. More specifically the present invention relates to a method and apparatus for separating the three components, water, oil and gas, of a hydrocarbon well stream.

Previous separators of the type similar to the present invention have had the disadvantage of not completely eliminating the liquid from the gas of the well stream or if they do make this separation satisfactorily then they do so at the expense of a large drop in the gas pressure caused by additional internal structure. Also, previous separators have had the disadvantage of being subject to surging and inaccuracy in the discharge of liquid or water. For example, if the liquid outlet is near the float controlling this outlet then when the outlet valve is opened the level near the outlet will fall, causing the float to drop and closing the outlet valve. This may set up waves on the surface of the liquid which in turn will cause the float to move up and down in response to the waves and not in response to the level of liquid in the vessel.

Also, previous separators have utilized inlet centrifugal separation but this is done only with extensive baffling and in vertical vessels some provision has to be made to prevent excessive turbulence in the zone in which the liquid being separated collects. Also, this centrifugal type separation has often been known to cause the re-entrainment of some of the smaller particles of liquid.

Therefore, the primary object of the present invention is to provide a method and an apparatus for separating a liquid from a gas in which the liquid mist is eliminated from the gas without excessive loss of gas pressure.

A further object of the present invention is to provide a separator having a novel inlet construction. A still further object of the present invention is to provide a novel structure for discharging liquids from a separation vessel. Another object of the present invention is to provide a separation vessel which may be used as a water knockout, a liquid knockout and a gas, oil and water separator with only minor internal modifications.

In accomplishing these and other objects of the present invention we have provided improved apparatus illustrated in the accompanying drawing wherein.

Figure 1:
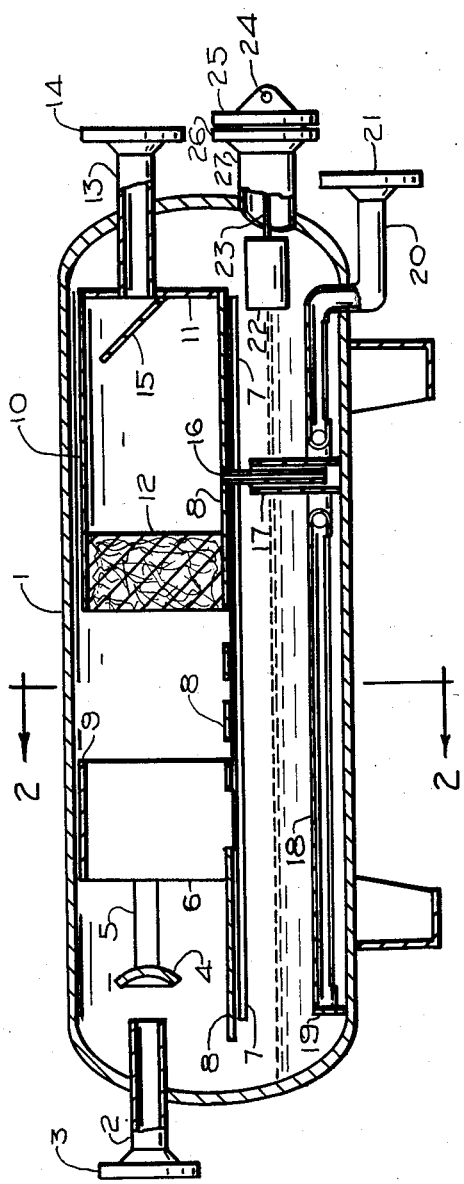
Fig. 1 is a longitudinal sectional view of a separator constructed in accordance with the present invention.

Referring more in detail to the drawing:

Separator 1 is a horizontal cylindrical vessel and is provided with inlet duct 2 extending into its interior at one end. Flange 3 is provided on inlet duct 2 so that suitable connection may be made to inlet duct 2. Duct 2 terminates a short distance within separator 1 and is directed toward and spaced from deflector plate 4. Struts 5 support deflector plate 4 in a substantially fixed position in relation to inlet duct 2 and are secured to straightening vanes 6. Angle supports 7 are secured to the interior of separator 1 a short distance below its centerline and extend almost to the entire length of separator 1. Divider plates 8 are positioned on and spaced along the length of angle supports 7. Divider plates 8 provide a support for vanes 6, vane housing 9 and mist eliminator housing 10. Vane housing 9 is constructed to fit closely to the upper interior of separator 1 above divider plates 8. Straightening vanes 6 are secured to vane housing 9 and to divider plates 8.

Mist eliminator housing 10 is mounted on divider plate 8 in a position spaced from the inner surface of the separator 1 and near the end of separator 1 opposite to inlet duct 2. One end of housing 10 is closed by plate 11 and the other end contains a mist eliminator element 12. Gas outlet duct 13 extends from the interior of housing 10 through plate 11 and out through separator 1 and terminates in a flange 14. Outlet baffle 15 is secured to plate 11 below the opening therein for gas outlet duct 13 and extends completely across housing 10 to prevent liquid within housing 10 from flowing out through gas outlet duct 13. Housing 10 is secured to divider plate 8 and plate 11 so that passage of gas therethrough may be limited to entering through mist eliminator element 12 and exhausting through gas outlet duct 13.

Tubular drain 16 depends downwardly through plate 8 terminating in spaced relationship to the lower inner surface of separator 1 and within pipe member 17. Pipe member 17 is secured to the interior of separator 1 and extends upwardly in surrounding relationship to tubular drain 16 to a height above the level of liquid to be contained within separator 1.

Liquid drain member 18 is positioned in the lower portion of separator 1. Member 18 is a pipe having a narrow slot on its lower side along a substantial portion of its length and being closed at its inner end by plate 19 which also provides support for member 18 in a position slightly above the lower inner surface of separator 1. Member 18 terminates as outlet duct 20 which extends out of separator 1. Flange 21 is secured to the end of outlet duct 20 projecting from separator 1 to provide adequate connection to suitable disposal means for the separated water. Float 22 is connected by arm 23 and shaft 24 to some external means for controlling the flow of liquid out of separator 1 through duct 20. Shaft 24 is mounted in float flange 25 which in turn is connected to a flange 26 on pipe 27. Pipe 27 is secured into separator 1 and serves to connect float flange 25 to separator 1 so that movement of float 22 will be transmitted as a rotation of shaft 24. This movement can then be transduced to control the discharge of liquid through duct 20 and flange 21 by connecting a discharge control valve (not shown) to flange 21.

Figure 2:
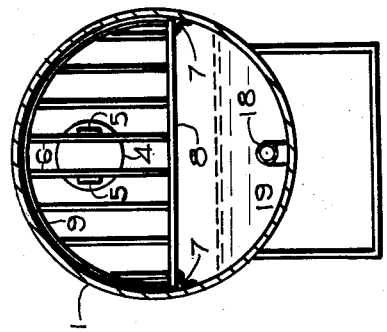
Fig. 2 is a sectional view of the separator shown in Fig. 1 taken along lines 2—2.
Figure 3:
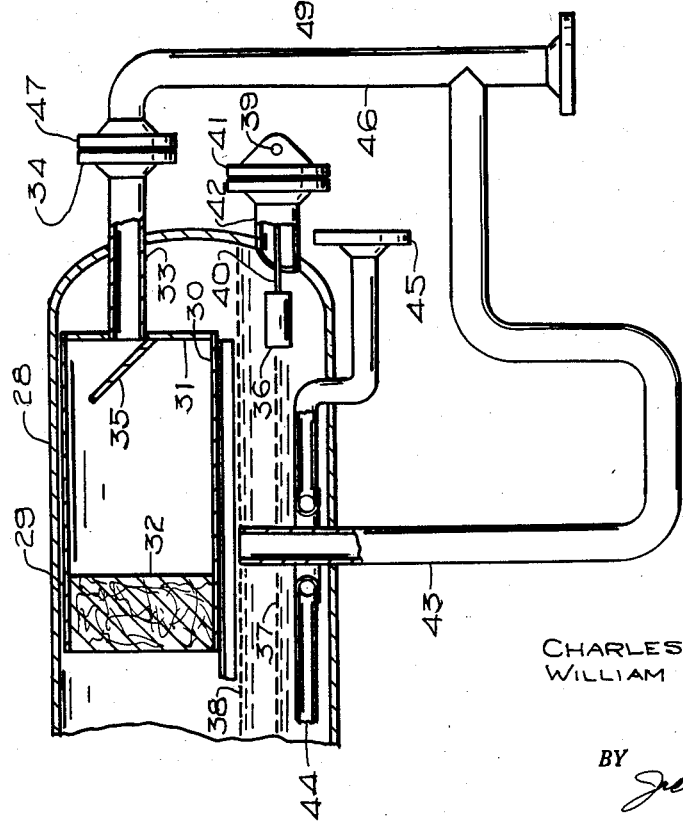
Fig. 3 is a partial longitudinal sectional view of a modified form of the present invention.

Separator 1 shown in Figs. 1 and 2 will remove all liquids from a gas stream and discharge them separately. Separator 28 shown in Fig. 3 is a device commonly termed a free water knockout and functions to remove the water component from the oil and gas components of a well stream. In construction the inlet portion of separator 28 is similar to that portion of separator 1 as illustrated in Figs. 1 and 2 and the mist eliminator housing 29 is also similar to housing 10. Mist eliminator housing 29 is supported on divider plate 30 and is sealed by plate 31 at its outlet end. Mist eliminator element 32 is positioned in housing 29 and gas outlet duct 33 extends out through plate 31 and separator 28 and terminates in a flange 34 or other suitable connection means. Outlet baffle 35 is secured to plate 31 below the opening of duct 33 therein to prevent the liquid within housing 29 from flowing out through gas outlet duct 33.

Float 36 is made to be an interfacial float so that it will assume a position indicative of the water level 37 within separator 28 and remain submerged below oil level 38. Movement of float 36 responsive to a change in water level 37 will cause a rotation of shaft 39 because of the connection therebetween by float arm 40. Shaft 39 is supported on float flange 41 which in turn is secured to separator 28 by pipe 42.

Oil outlet duct 43 extends into separator 28 up to the desired oil level 38. Liquid drain member 44 is constructed similar to liquid drain member 18 and is flanged by flange 45 to provide connection to a suitable water disposal means. Oil outlet duct 43 is U-shaped to form a liquid trap and is connected into duct 46 which is connected to gas outlet duct 33 by flanges 34 and 47. Sufficient height should be given to the U-shaped portion of duct 43 to prevent flow of gas out of separator 28 into duct 46 through oil outlet duct 43. This height may be relatively small since the height need only offer more resistance to flow than the slight pressure drop of the gas flowing through the mist eliminator element 32.

Figure 4:
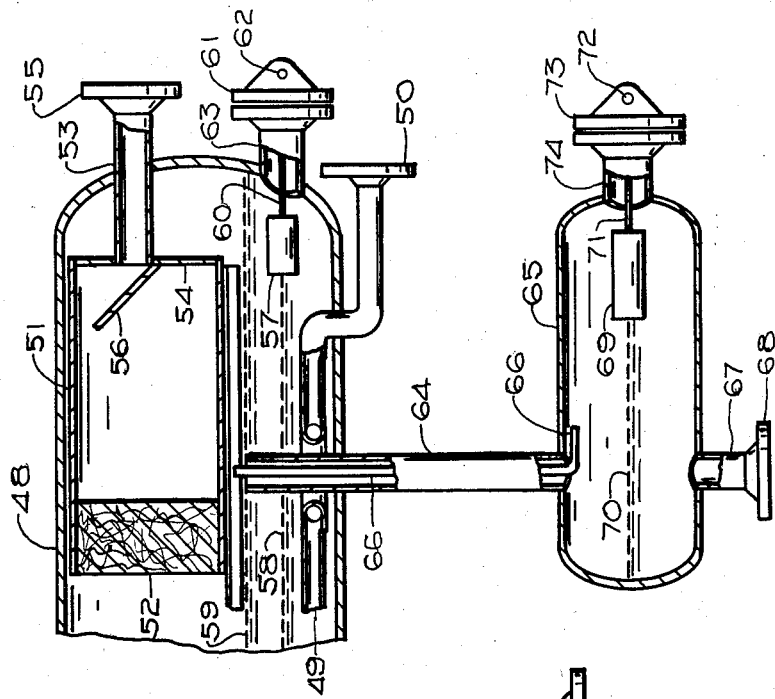
Fig. 4 is a partial longitudinal sectional view of another modified form of the present invention.

In Fig. 4 separator 48 is depicted in a form whereby a three-phase separation may be made, that is, the three components of a well stream, water, oil and gas, may be separated and each separately discharged from separator 48. Again the construction of the inlet end of separator 48 and liquid drain member 49 is similar to the construction in separator 1 shown in Fig. 1. Liquid drain member 49 is flanged by flange 50 to provide an outlet for the water collecting within the lower portion of separator 48.

Mist eliminator housing 51 contains mist eliminator element 52 and gas outlet duct 53 extends from plate 54 which forms one end of mist eliminator housing 51. Gas outlet duct 53 extends out through separator 48 and terminates in flange 55. Outlet baffle 56 is positioned below the opening of gas outlet duct 53 into plate 54.

Float 57, an interfacial float, will float at a level which will be indicative of the water level 58 within separator 48 and will not be affected by the oil level 59 therein. The position of water level 58 will be transmitted through float arm 60, float flange 61 to shaft 62 which will be connected to means for controlling the flow of water out through liquid drain member 49. Float flange 61 is connected to separator 48 by pipe 63.

Oil outlet duct 64 extends to oil surge chamber 65 from a position within separator 48 at the desired height of oil level 59. Extending through oil outlet duct 64 is gas equalization line 66 to equalize the gas pressure between separator 48 and oil surge chamber 65. Surge outlet duct 67 extends from the lower portion of oil surge chamber 65 and terminates in flange 68. Float 69 within surge chamber 65 floats on the surface of the oil within chamber 65 and thereby indicates oil level 70. Float arm 71 connects float 69 to shaft 72 through float flange 73. Float flange 73 is connected to chamber 65 by pipe 74. Shaft 72 should be connected to the operating mechanism of a discharge valve in surge outlet duct 67 to maintain oil level 71 at a substantially constant level.

In operation the separators 1, 28 and 48 all function in a similar manner and the latter two differ only in the provision made for the additional separation of the water and oil. The combined fluids of the well stream flow into separator 1 through inlet duct 2 and are directed against the central portion of deflector plate 4. Since deflector plate 4 presents a concave surface, the well stream will be deflected by deflector plate 4 radially outward and will have a slight component of flow in a direction opposite to the direction of flow of the well stream flowing through inlet duct 2. The liquid components of the well stream will flow outwardly and come into contact with the inner surface of separator 10 or the surface of divider plate 8. With this contact established, most of the liquid will flow toward the lower portion of separator 1.

The proper design of deflector plate 4 and the relationship between deflector plate 4 and inlet duct 2 has been found to be of considerable importance in the removal of the liquid component from the gas component of the well stream. The relationship which from experiment approaches ideal conditions is as follows: Assuming the diameter of the inlet duct to be the constant factor since it will be designed to provide a reasonable inlet velocity, then the distance from the end of inlet duct 2 to deflector plate 4 will be approximately one diameter and the diameter of deflector plate 4 will be two diameters. Also, it has been found that the position of the foremost portion of straightening vanes 6 should be approximately one foot from the end of inlet duct 2.

Straightening vanes 6 are positioned vertically so that nothing hinders the drainage of the liquid which collects thereon. Vanes 6 are used mainly to prevent vortex flow and excessive turbulence. Vane housing 9 is constructed to be closely adjacent to the inner surface of separator 1 so that it will act as a wiper and cause any liquids flowing on this surface to be drained downwardly and prevented from proceeding the length of separator 1. Thus, vane housing 9 serves two purposes, support for vanes 6 and wiper action on the top inner wall of separator 1.

Divider plates 8 also serve a dual function in that they serve to control turbulence to allow the maintenance of a relatively quiet zone whereby settling and gravity separation of the oil and water components of the flow may be accomplished and they provide foundation support for vane housing 9, vanes 6 and for mist eliminator housing 10. Divider plates 8 are spaced apart to allow any liquid falling on a single plate to drop into the lower settling zone of separator 1 and to prevent it from being carried along the length of separator 1 and being re-entrained in the gas component of the flow.

The gas component of the flow passes over vanes 6 after being deflected by deflector plate 4 and enters mist eliminator element 12 wherein the last remaining mist will be eliminated from the gas. The gas is then discharged from separator 1 through gas outlet duct 13. The water and oil components collect within the lower portion of separator 1 and are discharged therefrom through liquid drain member 18, elbow 20 and flange 21 under the control of float 22. Tubular drain 16 provides drainage for liquids which have been separated from the gas by mist eliminator element 12 and which normally can be expected to collect within mist eliminator housing 10 since the direction of flow of the gas will cause the liquid draining from element 12 to flow inwardly. Outlet baffle 15 is positioned under the opening in plate 11 for gas outlet duct 13 to prevent any of the liquid collecting within mist eliminator housing 10 from being discharged through gas outlet duct 13. Drain member 16 terminates within pipe member 17 to provide a gas trap which will prevent by-passing of mist eliminator element 12 by the gas when the liquid content of separator 1 is low.

Liquid drain member 18 is constructed to allow the discharge of liquid from the lower portion of separator 1 without causing the usual surging and instability of the liquid level therein. Liquid drain member 18, being slotted along an appreciable length of its lower side, will draw liquid for discharge from separator 1 substantially along its entire length. Thus, there is no sudden discharge of a large volume of liquid from a single local area which would cause a sudden lowering of the liquid level within such area and subsequently a drastic increase in liquid turbulence, particularly if the local drop in liquid is within the area in which the liquid level float is positioned. Thus, before adequate discharge of liquid could be had with previous structures not having a slotted liquid drain member, the liquid level would fall causing the local float to drop and shut off the discharge valve controlling the liquid discharge. With the discharge closed the level immediately rises, causing the float to rise and again opening the liquid discharge. This action will complicate any desired separation between the oil and water components of the flow. The operation of slotted liquid drain member 18 becomes more important in the operation of separator 1 when it is desired that the oil and water component be separated by stratification and each separately discharged. Thus, the turbulence caused by the liquid discharge from prior structures would effectively prevent a satisfactory stratification of the oil and water components.

In use in the present invention liquid drain member 18 by its novel construction causes the liquid being discharged to be uniformly withdrawn from separator 1, i.e., the liquid is taken into liquid drain member 18 at all points along the slots. This uniform withdrawal of liquid will avoid turbulence of the liquid and thereby permit the desired stratification.

In operation separator 28 in Fig. 3 functions similarly to separator 1 of Fig. 1. The inlet end of separator 28 is identical with the inlet end of separator 1 and the only change in the opposite end is the provision for separating the water and oil components which have been separated from the gas component of the flow. Liquid drain member 44 operates in a manner similar to liquid drain member 18 as previously described and because of its slotted construction it will discharge water uniformly from the lowest portion of separator 28.

Oil outlet duct 43 is provided to skim the oil from the top of the liquids collecting in separator 28. Duct 43 is U-shaped to provide a gas trap, which prevents gas from by-passing mist eliminator element 32. Since separator 28 is the type of separator commonly termed a water knockout and since it is desired to have the oil and gas components combined, oil outlet duct 43 is connected to duct 46 which is connected to gas outlet duct 33.

Separator 48 of Fig. 4 is also similar to separator 1 of Fig. 1 in that its inlet design is the same and the operation and construction of liquid drain member 49 is similar to that of liquid drain member 18. Liquid drain member 49 discharges water which collects in the lowest portion of separator 48. Oil is conducted through oil outlet duct 64 to oil surge chamber 65. The level of the upper edge of duct 64 within separator 48 will determine the height of liquid within separator 48. Gas equalizing line 66 is secured within duct 64 and provides a connection between separator 48 and oil surge chamber 65 which will not be blocked by the flow of oil within duct 64 and which will thereby provide an equalization of pressures between the vessels at all times. Oil is discharged from oil surge chamber 65 through surge outlet duct 67 in response to oil level 70 as indicated by the position of float 69.

Separator 48 is a separator in which the liquid component is separated from the gas component of the flow and in which the liquid component is separated into its two immiscible components and each component is separately discharged from separator 48 free of each of the other components.

Thus, it may be seen from the foregoing specification that we have provided a novel method and apparatus for separating a liquid from a gas in which the liquid mist is eliminated from the gas without excessive loss of gas pressure. Also we have provided a novel inlet structure for a separator and a novel liquid drain member.

What we claim and desire to secure by Letters Patent is:

1. An oil and gas separator comprising, a separation vessel, an inlet into one end of said vessel, an inlet chamber in said vessel, a circular concavo-convex deflector plate within said inlet chamber, a plurality of horizontal transverse divider plates positioned across said vessel in spaced relationship, a gas collecting chamber within said vessel, a mist elimination section positioned between said inlet chamber and said gas collecting chamber, a gas outlet from said gas collecting chamber extending out of said vessel, a liquid collecting zone in said vessel, a drain trap connecting said liquid collecting zone to said gas collecting chamber, a liquid outlet from said vessel, a tubular drain member positioned in and extending through substantially the entire length of said liquid collecting zone, said drain member being slotted on its lower periphery along a substantial portion of its length and connected to said liquid outlet.

2. Invention according to claim 1 including, a float member within said liquid collecting zone, said float being connected to control the discharge of separated liquid from said vessel.

3. An oil and gas separator comprising a horizontal separation vessel; an inlet chamber in said vessel; a circular concavo-convex deflector plate disposed within said inlet chamber and having the plane containing the entire peripheral edge thereof normal to the horizontal axis of said vessel; an inlet for a stream of an oil and gas mixture extending horizontally into said inlet chamber and positioned symmetrically with reference to the center of said deflector plate, said inlet facing the concave side of said plate, whereby a stream proceeding from said inlet impinges on said deflector plate at an angle different from 90°; a gas collecting chamber within said vessel; a mist elimination section positioned between said inlet chamber and said gas collecting chamber; a gas outlet from said gas collecting chamber extending out of said vessel; a liquid collecting zone in said vessel, and a liquid outlet from said collecting zone.

4. A separator according to claim 3, which includes straightening vanes positioned between said deflector plate and said mist elimination zone.

5. A separator according to claim 3, which is provided with a second liquid outlet from said vessel, and wherein said second liquid outlet is connected to said gas outlet.

6. A separator according to claim 3, which is provided with a second liquid outlet from said vessel and a surge vessel connected to said second liquid outlet, and wherein a pressure equalizing means connects said separation vessel and said surge vessel.

7. A separator according to claim 3, which is provided with a tubular drain member positioned in said liquid collecting zone, said drain member being slotted on its lower periphery along a substantial portion of its length and connected to said liquid outlet.

8. A separator according to claim 3, wherein there is provided a plurality of spaced, horizontally positioned, transverse divider plates disposed across said vessel, and wherein one of said divider plates forms the lower surface defining said gas collecting chamber, and a drain member extending into said liquid collecting zone through said divider plate which forms the lower surface of said gas collecting chamber.

References Cited in the file of this patent

UNITED STATES PATENTS

| | | |
|---|---|---|
| 1,534,831 | Berg | Apr. 21, 1925 |
| 1,760,351 | Evans | May 27, 1930 |
| 2,610,697 | Lovelady et al. | Sept. 16, 1952 |
| 2,614,648 | Wilson | Oct. 21, 1952 |
| 2,656,896 | Glasgow | Oct. 27, 1953 |
| 2,678,108 | Reid | May 11, 1954 |
| 2,681,150 | Reid | June 15, 1954 |
| 2,685,938 | Walker et al. | Aug. 10, 1954 |
| 2,710,071 | Kinser et al. | June 7, 1955 |
| 2,760,594 | Browning et al. | Aug. 28, 1956 |
| 2,785,766 | Murdock | Mar. 19, 1957 |
| 2,788,080 | Guarin | Apr. 9, 1957 |